June 28, 1955  H. B. KATCHER ET AL  2,711,769
COVER FOR AIR CONDITIONING UNITS
Filed Dec. 12, 1952  2 Sheets-Sheet 2
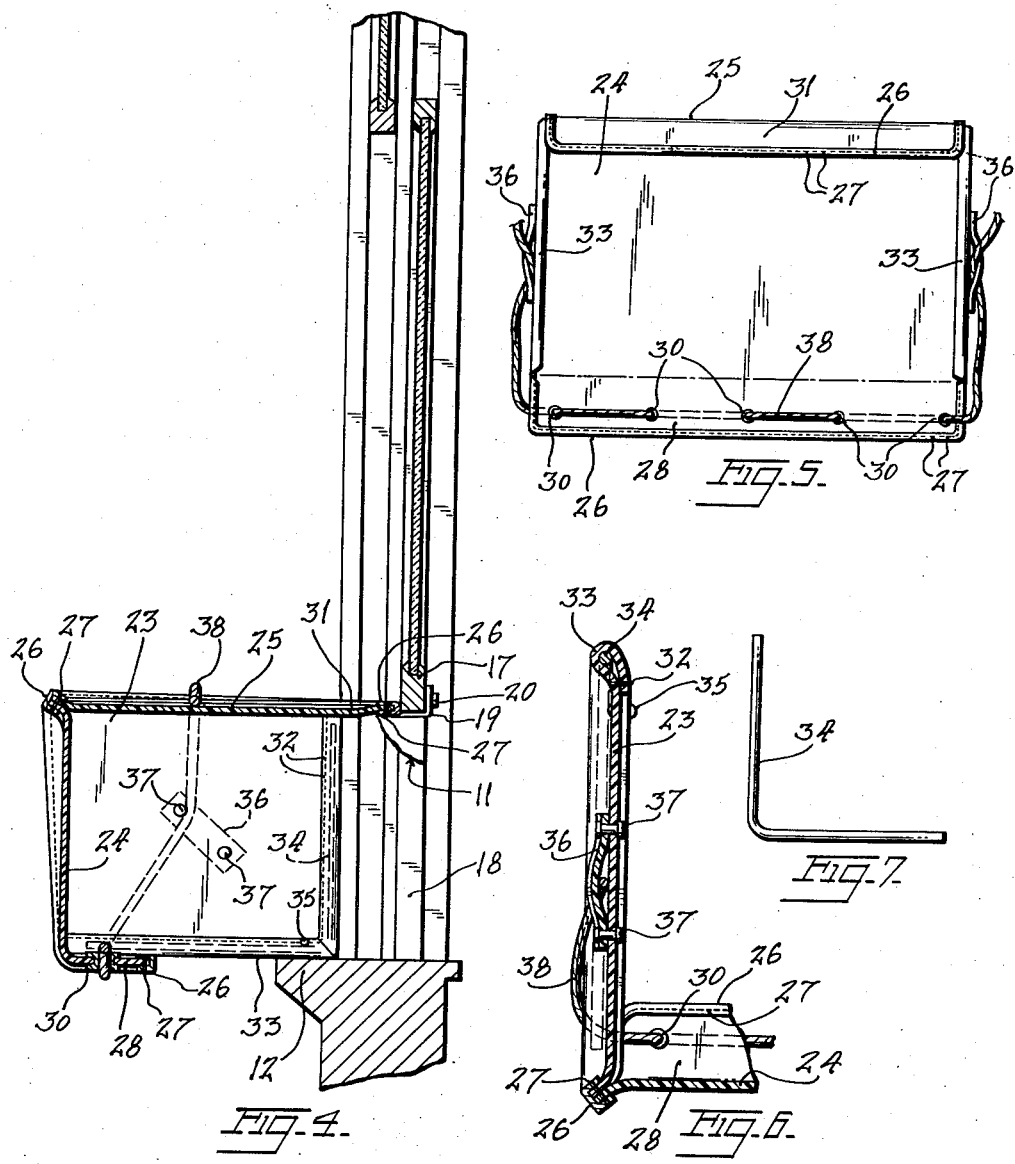
INVENTORS
HARRY B. KATCHER
BY JACK GRAUBARD
ATTORNEY

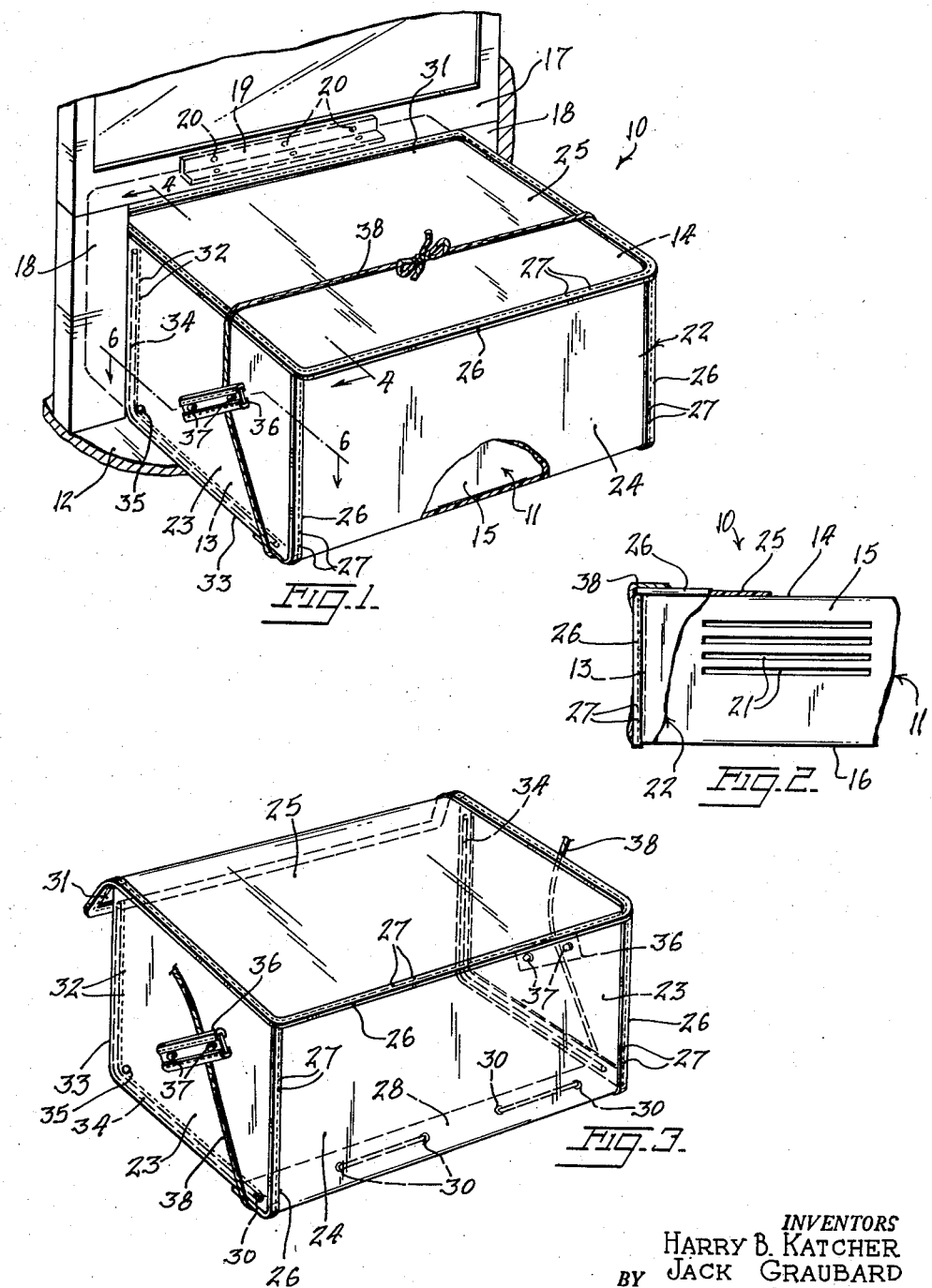

United States Patent Office 2,711,769
Patented June 28, 1955

2,711,769

COVER FOR AIR CONDITIONING UNITS

Harry B. Katcher and Jack Graubard, Brooklyn, N. Y.

Application December 12, 1952, Serial No. 325,644

2 Claims. (Cl. 150—52)

This invention relates to covers for utilitarian devices supported outside of windows of buildings and more particularly to a new and useful improvement in a cover for the protruding portion of an air conditioner unit supported partly outside of a window of a house.

Many types of air conditioner units for rooms are mounted in open windows with a portion of the unit inside the room and a portion protruding outside the window. The protruding portion is exposed to the weather elements and is liable to become corroded, warped, soiled or otherwise damaged by the elements. Furthermore, in certain climates it is necessary to remove the air conditioner unit from the window during the cold seasons and store it away which is bothersome and costly.

It is the principal object of the present invention to provide removable covers for the outwardly protruding portion of such an air conditioner unit, for a room, in order to protect the unit from the elements and prevent it from becoming dirty, corroded or warped, or otherwise damaged.

Another object of the invention is to provide a removable cover for an air conditioner unit of this kind which is adapted to be readily mounted on and removed from any standard type of air conditioner unit.

A further object of the invention is to provide such a removable cover with ready means for and fitting and securing same to an air conditioner unit.

It is further proposed to provide a removable cover for an air conditioner unit which is simple and which may be manufactured and sold at a reasonable cost.

For further comprehension of the invention and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a window with an air conditioner unit installed thereon and having a cover embodying the invention.

Fig. 2 is a reduced fragmentary end view of the air conditioner unit with the end of the cover partly broken away.

Fig. 3 is a perspective view of the cover in extended position, removed from the air conditioner unit.

Fig. 4 is a vertical sectional view taken on the plane of the line 4—4 of Fig. 1, the air conditioner unit being omitted.

Fig. 5 is a front view of the cover.

Fig. 6 is an enlarged sectional view taken on the plane of the line 6—6 of Fig. 1.

Fig. 7 is a side elevational view of the reinforcing corner rod.

Referring to the drawings in detail, in Fig. 1 is shown a conventional type of air conditioner unit adapted to be mounted within the window opening in such a manner that a section or portion 10 thereof, is positioned on the outside of said opening and a portion thereof (not shown), is positioned on the inside of the window opening in the room to be cooled. This enables free circulation of two wholly independent air streams through the unit.

The portion of the unit extending outside of the window opening is suitably enclosed within a rectangular-shaped housing structure 11, which rests on the window sill 12, of the window. This housing is formed of sheet material, such as sheet metal, and it includes side walls 13, a top wall 14, a back wall 15, and bottom wall 16, but is open at the front disposed toward the inside of the room. The window opening is sealed at the top by the window sash 17, contacting the top wall 14, of the housing structure 11 and prior to moving the window sash to sealing position, suitable filler walls 18, are inserted into the spaces between the side walls 13 of the housing and the sides of the window casing so as to completely seal the window opening. A clamping bar 19, preferably in the form of an L-bar is rested upon the top of the housing structure 11 inside the window sash and is brought into tight clamping engagement with the inside face of the window sash by means of bolts 20, so as to firmly clamp the upper portion of the housing structure tightly against the window sash. The housing structure is provided with louvered openings 21 in its rear wall 15, to conduct outside atmosphere into the interior of the room.

In accordance with the present invention, a removable cover 22 is provided for the portion 10 of the air conditioner unit protruding outside of the window. The cover is of the same general shape as the housing structure 11 and is formed of sheets of plastic material, canvas or any other suitable flexible material, secured together to provide, as viewed in Fig. 1, side walls 23, rear wall 24 and top wall 25, the cover being open at the bottom and at the front end disposed toward the inside of the room.

The meeting edges of the sheets are finished off by tapes 26 and secured together by lines of stitching 27 passing through the tapes, and edges. The rear wall 24 is formed with an extension or flap 28 which projects below the side walls 23. The side edges of the flap 28 are finished by the tapes 26 between the rear and side walls. Eyelets 30 penetrate the flap at spaced intervals therealong. The top wall 25 is similarly formed with an extension or flap 31, the edges of which are finished off by the tapes 26 between the side and top walls.

The front end and bottom end edges of each side wall 23 are bent over and secured by a line of stitching 32 to form looped portions 33. An L-shaped rod 34 is mounted in the looped portions of each side wall whereby the end and bottom edges of said side walls are reinforced in order to give the side walls a degree of rigidity, both vertically and horizontally as viewed in Fig. 1. This L-shaped rod 34 may be made of metal, glass, wood, hard rubber, plastic such as Lucite, or any other suitable material. A rivet 35 may be passed through each side wall adjacent the corner of the L-shaped rod therein in order to reinforce the stitching at this point. A short strap 36 is secured at its ends by rivets 37 to each side wall 23, the remainder of the strap being free of the wall and adapted to be looped In use, the cover is placed over the outwardly protruding portion 10 of the air conditioner unit, with its open end facing the inside of the room and with the front flap 31, coacting with the window sash 17 for sealing the top of the housing structure 11. The flap 28 on the rear wall 24, is bent under the unit and a strand of rope 38, is employed for securing the cover in place on the unit. The rope is laced through the eyelets 30, in the flap 28, and its free ends are passed underneath the loose portions of the straps 36, on the side walls 23, and tied together at the top of the cover so as to effectively secure it to the air conditioner unit.

It is to be understood that in place of clamping bar 19, any other conventional type of mounting means may be used, such as the usual support bracket which is secured under the air conditioner unit.

While we have illustrated and described the preferred embodiment of our invention, it is to be understood that we do not limit ourselves to the precise construction herein disclosed and the right is reserved to all changes and modifications coming within the scope of the invention as defined in the appended claims.

Having thus described our invention, what I claim as new, and desire to secure by United States Letters Patent is:

1. A cover for the outwardly protruding portion of a window-supported air conditioning unit or the like comprising a flexible hollow body of sheet material having top, side and rear wall portions and being open at the front and bottom, a flap on the front end of the top wall portion, a flap on the bottom end of the rear wall portion, said latter flap having spaced eyelets therealong, short straps secured to the side wall portions, said straps having unattached portions forming loops, and flexible means cooperating with said loops and with said eyelets for holding the rear flap against the lower edges of the side wall portions in closed sealing position, said front flap being adapted to cooperate with the window sash for sealing the window opening at the top of the cover.

2. A cover for the outwardly protruding portion of a window-supported air conditioning unit or the like comprising a flexible hollow body of sheet material having top, side and rear wall portions and being open at the front and bottom, tapes along the junctures of said wall portions, a flap on the front end of the top wall portion, a flap on the bottom end of the rear wall portion, said latter flap having spaced eyelets therealong, short straps secured to the side wall portions, said straps having unattached portions forming loops, flexible means cooperating with said loops and with said eyelets for holding the rear flap against the lower edges of the side wall portions in closed sealing position, said front flap being adapted to cooperate with the window sash for sealing the window opening at the top of the cover, and angular reinforcing rods along the front and bottom end edges of the side walls.

References Cited in the file of this patent
UNITED STATES PATENTS

| Number | Name | Date |
|---|---|---|
| Re. 10,450 | Kraemer | Feb. 26, 1884 |
| 1,243,381 | Bokop et al. | Oct. 16, 1917 |
| 1,669,616 | Johnson | May 15, 1928 |
| 2,061,091 | Roth | Nov. 17, 1936 |
| 2,113,294 | Dotten | Apr. 5, 1938 |
| 2,614,598 | Hall et al. | Oct. 21, 1952 |